United States Patent Office 2,933,467
Patented Apr. 19, 1960

2,933,467

EMULSION POLYMERIZATION PROCESS

Jules Borunsky, Sarnia, Ontario, Canada, assignor to Polymer Corporation Limited, Sarnia, Ontario, Canada, a corporation of Canada No Drawing. Application May 13, 1955
Serial No. 508,310

Claims priority, application Canada March 4, 1955

8 Claims. (Cl. 260—27)

This invention relates to modified dispersing or emulsifying agents and to their use in the polymerization of polymerizable compounds.

The invention is concerned with two types of polymerizations, namely, (1) Dispersion or bead type polymerization in which the unchanged monomer is distributed in a finely divided liquid state throughout a non-reactive medium with the aid of dispersing agents.

(2) Emulsion type polymerization in which the unchanged monomer is distributed in a finely divided liquid state throughout a non-reactive medium with the aid of emulsifying agents.

For convenience, the present specification hereinafter uses the term "dispersion" to include both what is normally termed "dispersion," namely the dispersion of a solid in a liquid, and also what is normally termed "emulsion," namely the dispersion of a liquid in a liquid. The term "dispersing agent" is accordingly used hereinafter to include both dispersing and emulsifying agents, though, as is well known, there are many compounds which can be used either as dispersing or emulsifying agents.

Dispersing agents keep the finely divided monomer from coalescing when distributed throughout the non-reactive medium, form a protective layer around the polymer particles as they are formed and thus prevent premature coagulation of the particles, and provide the first major locus of reaction. In addition, some of these agents act as softeners and mild accelerators in the curing of vulcanizates while others act as mild retarders.

However, it has been discovered that these dispersing agents do not always achieve the purpose of forming a stable protective layer around the polymer particles. In these cases, considerable amounts of coagulum are formed, making the processing of the latex difficult due to the fouling of equipment. Furthermore, in the polymerization at temperatures of about 5° C., it has been necessary to use more powerful and complex activating and catalytic systems compared to those used when polymerization takes place at about 50° C.

The initiator activators which have been most universally used in the past have been peroxygen compounds, both organic and inorganic in nature. Examples of the organic types are cumene hydroepoxide and di-isopropylbenzene hydroperoxide, while examples of the inorganic types are potassium and sodium persulfates.

It is a principal object of the present invention to suggest a modified dispersing agent which simultaneously performs the function of dispersing, activating and initiating in dispersion polymerization reactions.

According to the present invention, such a modified dispersing agent is an ozonized dispersing agent.

Suitable dispersing agents which may be ozonized and used according to the present invention are of the following types:

(1) Rosin soaps, such as the alkali metal salts of abietic acid, dehydroabietic acid and tetrahydroabietic acid.

(2) Fatty acid soaps, i.e. alkali metal salts of aliphatic carboxylic acids containing 5 to 25 carbon atoms and from 0 to 3 olefinic linkages therein, such as alkali metal salts of lauric acid, myristic acid, palmitic acid, stearic acid, oleic acid and linoleic acid.

(3) Anionic emulsifiers such as alkyl aryl sulfonates, alkyl sulfates; sulfated amides, amines, esters, and ethers; sulfonated amides, amines, esters and ethers; alkyl sulfonates and nitrosyl sulfates.

(4) Non-ionic emulsifiers such as acid derivatives of oils, fats, rosin acids, glycerols, glycols, ethylene oxide and amines; and alcohol, phenol, naphthol, alkyl phenol, amide and amine derivatives of ethylene oxide.

In one method, ozonized dispersing agent according to the present invention is prepared by passing an ozone-containing gas, preferably ozone-containing oxygen, through an aqueous solution of the dispersing agent. Then the excess gases are removed from the solution by flushing with an inert gas, preferably nitrogen. This ozonized dispersing agent is then used in the place of the dispersing agents previously used in well-known polymerization recipes. This solution of dispersing agent also has the added ability of initiating and catalyzing the reaction. Although the usual initiators and catalysts may, therefore, be omitted from the conventional polymerization recipe, they may, if desired, also be added along with the ozonized dispersing agent.

To obtain satisfactory results, it is preferable that every 1.0 gram of dispersing agent used in the polymerization be treated with at least 0.05 gram of ozonizing agent.

The ozone used in the present invention is suitably produced by subjecting oxygen to a silent electrical discharge in a glass tube 20" long and ⅔" in diameter. Through the centre of the tube is passed a glass rod around which a platinum wire is coiled. The tube is sealed at both extremities, the ends of the platinum wire being sealed in with the rod. An orifice is provided at each end of the tube for the circulation of oxygen. The entire outer surface of the tube between the orifices is covered with a thin aluminum foil. This aluminum foil, along with one end of the platinum wire, is connected to a 10,000 volt transformer regulated by a 115 volt variac. A silent discharge results when contact is made between the platinum wire and the aluminum foil through the transformer. A stream of dry oxygen, when passed under slight pressure through the glass tube and subjected to the discharge, contains approximately 1–2% by weight ozone. Greater proportions of ozone may be formed by recycling the gas through the glass tube.

Polymerizable compounds which may be used in this invention are in general those containing a terminal methylene group attached by a double bond to a carbon atom, e.g. the vinyl group $CH_2=CH-$, and undergo addition polymerization to produce polymers which are predominantly linear in character. Included among these materials are the conjugated open chain dienes such as butadiene-1,3, 2,3-dimethylbutadiene-1,3, isoprene, chloroprene and piperylene; mixtures of two or more of these conjugated dienes, such as butadiene-1,3 and isoprene; monomeric mixtures of these conjugated dienes with aryl olefins and substituted aryl olefins such as styrene, chlorostyrene, α-methylstyrene, acrylic and methacrylic acids; acrylic acid derivatives such as acrylic acid, acrylonitrile, methyl acrylate, methyl methacrylate, butyl acrylate and methacrylamide; other vinyl compounds such as divinyl benzene, vinyl ethers and vinyl ketones; vinylidene compounds such as vinylidene chloride; trienes such as myrcene; and compounds containing both olefinic and acetylenic bonds, such as vinyl acetylenes.

The following formulae are typical recipes in which the ozonized emulsifiers of the present invention may be used. The figures are given in parts by weight.

FORMULA I

| | |
|---|---|
| Butadiene-1,3+styrene | 100 |
| Water | 180 |
| Potassium persulfate | 0.30 |
| Dodecyl mercaptan | 0.50 |
| Emulsifier | 4.0 |

FORMULA II

| | |
|---|---|
| Butadiene-1,3+styrene | 100 |
| Water | 180 |
| Cumene hydroperoxide | 0.17 |
| Mixed tertiary mercaptan | 0.40 |
| Emulsifier | 5.0 |
| Fructose | 0.50 |
| $K_4P_2O_7$ | 1.5 |
| $FeSO_4 \cdot 7H_2O$ | 0.020 |

FORMULA III

| | |
|---|---|
| Butadiene-1,3 | 100 |
| Water | 180 |
| Cumene hydroperoxide | 0.20 |
| Mixed tertiary mercaptan | 0.40 |
| Emulsifier | 5.0 |
| KCl | 0.80 |
| KOH | 0.10 |
| Tetraethylenepentamine | 0.40 |

FORMULA IV

| | |
|---|---|
| Butadiene1,3-acrylonitrile | 100 |
| Water | 250 |
| Cumene hydroperoxide | 0.10 |
| Mixed tertiary mercaptan | 0.50 |
| Emulsifier | 4.0 |
| Sodium formaldehyde sulfoxylate | 0.05 |
| $FeSO_4 \cdot 7H_2O$ | 0.005 |

FORMULA V

| | |
|---|---|
| Butadiene-1,3 | 100 |
| Water | 180 |
| Diazothioether | 0.20 |
| Mixed tertiary mercaptan | 0.35 |
| Emulsifier | 5.0 |

The following examples are given to illustrate the invention:

*Example I.—Polystyrene latex and rosin soap dispersant*

Two 8-ounce polymerization bottles were each charged with 59.0 gms. of water and 18 gms. of an aqueous soap solution containing 2.6 gms. Dresinate 214 (100% basis), 0.28 gm. trisodium phosphate, 0.05 gm. Daxad 11 and 0.14 gm. KCl per 100 gms. of solution.

Dresinate 214 is the potassium base rosin soap manufactured by the Hercules Powder Co., Wilmington, Delaware.

Daxad 11 is the sodium salt of β-napththalenesulfonic acid condensed with formaldehyde, manufactured by the Dewey & Almy Chemical Co., Cambridge, Mass.

2.7 liters of oxygen containing 1% by weight of ozone were bubbled through the emulsifier solution in bottle No. 1 following which nitrogen was bubbled through the solution for 10 minutes to remove any free oxygen or unreacted ozone. Bottle No. 2 was not ozonized. The following were then added to each bottle:

| | |
|---|---|
| Styrene gms | 35.0 |
| Mixed tertiary mercaptan (1.2% in styrene) gms | 9.0 |
| Dextrose solution mls | 4.4 |
| Activator solution mls | 2.0 |

The dextrose solution was prepared by dissolving 5.0 gms. of dextrose and 2.0 gms. of 10% KOH in water and making up the whole to 50.0 gms. with water.

The activator solution was prepared by dissolving 0.525 gm. ferrous sulfate heptahydrate and 0.675 gm. potassium pyrophosphate in water and making up the whole to 50.0 gms. with water.

The samples were then polymerized at 55° F. with the percent solids being determined at 17 and at 40 hours time. The results are given in Table I.

TABLE I

| Time (Hrs.) | Percent Solids in— | |
|---|---|---|
| | Bottle No. 1 | Bottle No. 2 |
| 17 | 12.0 | Nil |
| 40 | 29.0 | Nil |

Since a 29.0% solids content is equivalent to a 100% conversion, it is evident that the polymerization using an ozonized dispersing agent is very effective. At the same time it can be seen that the identical formula without the ozonized dispersing agent did not bring about polymerization.

*Example II.—High styrene content latex and fatty acid soap dispersant*

Five 32-ounce polymerization bottles were each charged with 371.2 gms. of 3.0% sodium stearate solution. A stream of oxygen, containing 2.2% by weight ozone, was bubbled through the soap solution, for various lengths of time, in order to add different amounts of ozone to each bottle. Nitrogen was then bubbled through the soap solution in each bottle for 10 minutes, in order to remove any free oxygen or unreacted ozone. Then 167.0 gms. styrene, 28.0 gms. butadiene-1,3 and 0.460 gm. mixed tertiary mercaptan dissolved in 5 mls. styrene were added to each of the bottles.

Each sample was polymerized at 104° F., with the percentage conversion being recorded at various reaction times. The results are given in Table II.

TABLE II

| Bottle No. | Liters of 2.2% ozone in oxygen | Percent Conversion in 15.5 hrs. | Percent Conversion in 22.5 hrs. | Percent Conversion in 40.0 hrs. |
|---|---|---|---|---|
| 1 | 0.57 | 24.4 | 40.0 | 51.0 |
| 2 | 1.14 | 3.5 | 9.2 | 65.6 |
| 3 | 1.9 | | 9.2 | 63.6 |
| 4 | 2.85 | | 2.1 | 57.3 |
| 5 | 3.8 | | | 61.9 |

These results indicate that with less ozonization the induction period is less but the overall pecentage conversion is also decreased. However, much greater degrees of ozonization do not appreciably change the overall percentage conversion.

*Example III.—High styrene content latex and fatty acid soap dispersant*

The experiments of Example II were repeated except that pure oxygen was used as the gas instead of a 2.2% ozone in oxygen gas. The results are given in Table III.

TABLE III

| | Bottle No. | | | | |
|---|---|---|---|---|---|
| | 1 | 2 | 3 | 4 | 5 |
| Liters of Oxygen | 0.95 | 1.9 | 3.8 | 5.7 | 7.6 |
| Percent Solids in 23 hrs | 2.1 | 2.1 | 2.1 | 2.2 | 2.2 |

These results indicate that without the ozonized dispersing agent the reaction proceeds very slightly and at a very slow rate.

*Example IV.—Low temperature (butadiene-1,3)-acrylonitrile latex and anionic emulsifier dispersant*

Nine 32-ounce polymerization bottles were each charged with 375.6 gms. of an emulsifier solution containing 0.06 gm. trisodium phosphate, 0.20 gm. Nacconol NRSF and 1.24 gms. Daxad 11 per 100 gms. of solution.

Nacconal NRSF is the sodium alkyl aryl sulfonate manufactured by the National Aniline Division of the Allied Chemical & Dye Corporation, New York, N.Y.

A stream of oxygen containing 2.2% by weight ozone was bubbled through the soap solutions in the bottles for various lengths of time in order to have different amounts of ozonized dispersing agent in each bottle. Nitrogen was then bubbled through the emulsifier solution in each bottle for 10 minutes in order to remove any free oxygen or unreacted ozone.

Then 54.8 gms. acrylonitrile, 95.3 gms. butadiene, 0.810 gms. mixed tertiary mercaptan dissolved in 2 mls. benzene and variable amounts of sodium formaldehyde sulfoxylate activator solution were added to each bottle. The sodium formaldehyde sulfoxylate solution was made up by dissolving the following in 100 mls. water.

|  | Gms. |
|---|---|
| Sodium formaldehyde sulfoxylate | 1.140 |
| $FeSO_4 \cdot 7H_2O$ | 0.200 |
| Ethylenediaminetetraacetic acid | 0.240 |
| NaOH (50% solution) | 0.240 |

The samples were polymerized at 55° F. and the percentage conversion determined at various times. The results are given in Table IV.

TABLE IV

| Bottle No. | Liters of 2.2% Ozone-Oxygen | Mls. of Activator Solution | Percent Conversion in 15.5 hrs. | Percent Conversion 21.5 hrs. |
|---|---|---|---|---|
| 1 | 0.57 | 1.5 | very little reaction. | very little reaction. |
| 2 | 0.57 | 3.0 | | |
| 3 | 0.57 | 4.5 | | |
| 4 | 1.9 | 1.5 | ----do------ | Do. |
| 5 | 1.9 | 3.0 | | |
| 6 | 1.9 | 4.5 | | |
| 7 | 2.85 | 1.5 | 18.0 | 28.0 |
| 8 | 2.85 | 3.0 | 48.7 | 73.0 |
| 9 | 2.85 | 4.5 | 67.2 | 76.0 |

These results indicate that optimum conversions are obtained only by a proper balance of activator with respect to ozonized dispersing agent in the polymerization recipe.

*Example V*

The experiments of Example IV were repeated except that pure oxygen was used instead of the 2.2% ozone-oxygen gas of Example IV. The results are given in Table V.

TABLE V

| Bottle No. | Liters of oxygen | Mls. of activator solution | Percent Conversion in 24 hrs. |
|---|---|---|---|
| 1 | 3.8 | 1.5 | very little reaction. |
| 2 | 3.8 | 3.0 | |
| 3 | 3.8 | 4.5 | |
| 4 | 7.6 | 3.0 | |
| 5 | 7.6 | 4.5 | |
| 6 | 7.6 | 6.0 | |
| 7 | 11.4 | 4.5 | |

These results indicate that the polymerization proceeds but very slightly when the dispersant is not ozonized.

*Example VI.—High styrene latex and anionic plus nonionic emulsifier dispersant*

Two 8-ounce polymerization bottles were each charged with 59 gms. emulsifier solution containing 1.28 gms. Nacconal NRSF, 1.28 gms. Daxad 11 and 3.84 gms. Antarox 403 per 100 gms. solution.

Antarox 403 is the condensate of ethylene oxide with a nonylated phenol, manufactured by the Antara Chemicals Division, General Dyestuff Corporation, New York, N.Y.

2.7 liters of oxygen containing 1% by weight ozone were bubbled through the solution in each bottle, following which nitrogen was bubbled through the solution in each bottle for 10 minutes to remove any free oxygen or unreacted ozone. Then 12.5 gms. of a 1.2% solution of mixed tertiary mercaptan in styrene, 32 gms. styrene and 30.0 gms. butadiene-1,3 were added to each bottle.

To bottle No. 1 was added 2.0 mls. of activator solution prepared as in Example I, but no activator was added to bottle No. 2. The samples were polymerized at 150° F., the percentage conversion at 19 hours reaction time being recorded in Table VI.

TABLE VI

|  | Bottle No. | |
|---|---|---|
|  | 1 | 2 |
| Percent solids at 19 hours | 47.0 | 44.0 |
| Percent conversion at 19 hours | 83.4 | 77.8 |

These results indicate that the activator solution increases the rate of the polymerization reaction somewhat.

*Example VII.—High styrene latex and anionic plus nonionic emulsifier dispersant*

Six 32-ounce polymerization bottles were each charged with 170 gms. of emulsifier solution containing 1.18 gms. Nacconal NRSF, 1.18 gm. Daxad 11 and 3.53 gms. Antarox 403 per 100 gms. of solution.

These emulsifier solutions were prepared in such a way that the different components and the combinations of them were treated with 3.8 liters of oxygen containing 2.2% by weight ozone. Nitrogen was then bubbled through each solution to remove the free oxygen and unreacted ozone. Then 0.40 gm. mixed tertiary mercaptan, 8.0 mls. of 10% sodium borate solution, 120.0 gms. styrene and 80.0 gms. butadiene-1,3 were added to each bottle.

The samples were polymerized at 140° F. and the percent solids determined at 24 and 41 hours. Table VII is a summary of the results obtained.

TABLE VII

| Bottle No. | Ozonized portion of emulsifier | Percent Solids at 24 hrs. | Percent Solids at 41 hrs. |
|---|---|---|---|
| 1 | Nacconal | 36.6 | 43.4 |
| 2 | Daxad | 24.6 | 31.4 |
| 3 | Antarox | 18.2 | 37.4 |
| 4 | Nacconal+Antarox | 18.0 | 40.5 |
| 5 | Nacconal+Daxad | 28.3 | 33.0 |
| 6 | Antarox+Daxad | exploded | |

These results indicate that a high yield (about 70%) is obtained even when only a portion of the dispersing agent is ozonized.

*Example VIII.—High styrene latex and anionic plus nonionic emulsifier dispersant*

Eight 32-ounce polymerization bottles were each charged with 180.0 gms. of emulsifier solution containing 1.1 gm. Nacconal NRSF, 1.1 gm. Daxad 11 and 3.3 gm. Antarox 403 per 100 gms. of solution. A stream of oxygen containing 2.2% by weight ozone was bubbled through the emulsifier of bottles 1, 2, 3, 4 and 5 for various lengths of time to achieve various degrees of ozonization. Bottles 6, 7 and 8 were treated with pure oxygen. Nitrogen was then bubbled through the emulsified solution in each bottle for 10 minutes to remove any free oxygen or unreacted ozone. Then 0.80 gm. sodium borate, 0.40 gm. mixed tertiary mercaptan, 120 gms.

styrene and 80.0 gms. butadiene-1,3 were added to each bottle.

The samples were polymerized at 150° F. and the percentage conversion determined at various times. Table VIII is a summary of these results.

TABLE VIII

| Bottle No. | Liters of 2.2% Ozone-oxygen | Liters of oxygen | Percent Conversion in 17 hrs. | Percent Conversion in 23 hrs. | Percent Conversion in 89 hrs. |
|---|---|---|---|---|---|
| 1 | 0.57 | | 18.9 | 26.4 | 62.6 |
| 2 | 0.95 | | 54.9 | 58.8 | 66.4 |
| 3 | 1.9 | | 62.0 | 64.5 | 70.1 |
| 4 | 2.85 | | 57.4 | 60.5 | 66.0 |
| 5 | 3.8 | | 63.7 | 67.6 | 72.2 |
| 6 | | 0.95 | 26.6 | 35.8 | 67.2 |
| 7 | | 4.75 | 20.4 | 27.1 | 60.5 |
| 8 | | 7.6 | 53.0 | 57.0 | 63.2 |

These results indicate that in polymerizations using ozonized dispersing agents the rate is increased and percentage conversion is greater than in polymerizations using dispersants oxidized with oxygen alone.

*Example IX.—Low temperature (butadiene-1,3)-styrene latex and anionic emulsifier plus rosin soap dispersant*

Twelve 32-ounce polymerization bottles were each charged with 361.3 gms. of emulsifier solution containing 6.41 gms. Dresinate 214 (87% solids), 0.133 gm. Daxad 11, 0.667 gm. trisodium phosphate and 0.330 gm. KCl per 100 gms. of solution. A stream of oxygen containing 2.2% by weight ozone was bubbled through the emulsifier in the bottles for various lengths of time in order to effect various degrees of ozonization. Nitrogen was then bubbled through the solution in each bottle in order to remove any free oxygen or any unreacted ozone.

Then 45.0 gms. water, 0.460 gm. mixed tertiary mercaptan in 2 mls. benzene, 70.0 gms. styrene, 130 gms. butadiene-1,3 and variable amounts of sodium formaldehyde sulfoxylate activator solution as prepared in Example IV.

The samples were polymerized at 55° F. and the percentage conversion at various times recorded. The results are given in Table IX.

TABLE IX

| Bottle No. | Liters of 2.2% ozone-oxygen | Mls. of activator solution | Percent Conversion in— | | | |
|---|---|---|---|---|---|---|
| | | | 17.0 hrs. | 41.0 hrs. | 65 hrs. | 77.0 hrs. |
| 1 | 1.9 | 4.0 | 4.2 | 9.3 | | |
| 2 | 1.9 | 5.0 | 4.2 | 22.0 | | |
| 3 | 1.9 | 6.0 | 4.3 | 20.2 | | |
| 4 | 2.85 | 4.0 | 5.1 | | 41.5 | 65.0 |
| 5 | 2.85 | 5.0 | 5.2 | | 52.6 | 56.5 |
| 6 | 2.85 | 6.0 | 6.7 | | 43.3 | 44.3 |
| 7 | 3.8 | 4.0 | 9.1 | | 69.3 | 78.5 |
| 8 | 3.8 | 5.0 | 7.3 | | 66.5 | 70.0 |
| 9 | 3.8 | 6.0 | 7.3 | | 69.2 | 74.0 |
| 10 | 4.7 | 4.0 | 4.8 | | | 63.0 |
| 11 | 4.7 | 5.0 | 4.2 | | 62.8 | 74.0 |
| 12 | 4.7 | 6.0 | 4.8 | | 64.0 | 70.0 |

These results indicate that using ozonized dispersants in the polymerization recipe results in very good conversions of monomers. The conversions are only slightly affected by changes in the amount of activating agents.

*Example X*

Six 32-ounce polymerization bottles were prepared as in Example IX, except that pure oxygen was used instead of ozone-oxygen. The results, summarized in Table X, indicate that very little polymerization occurs when dispersants oxidized with oxygen alone are used instead of ozonized dispersants.

TABLE X

| Bottle No. | Mls. of activator solution | Liters of oxygen | Percent Solids in 17.0 hrs. | Percent Solids in 24.0 hrs. | Percent Solids in 41.0 hrs. |
|---|---|---|---|---|---|
| 1 | 4.0 | 3.8 | 2.6 | 2.0 | 2.4 |
| 2 | 5.0 | 3.8 | 2.4 | 2.1 | 2.1 |
| 3 | 6.0 | 3.8 | 2.0 | 2.2 | 2.1 |
| 4 | 4.0 | 7.6 | 2.0 | 2.0 | 2.2 |
| 5 | 5.0 | 7.6 | 2.1 | 2.4 | 2.3 |
| 6 | 6.0 | 7.6 | 1.9 | 2.0 | 2.3 |

What I claim is:

1. In the aqueous emulsion polymerization of a polymerizable hydrocarbon compound containing 4–14 carbon atoms and a $CH_2=C<$ group in the presence of a water-soluble dispersing agent and a peroxygen catalyst for said polymerization, the improvement which comprises carrying out the polymerization while using as a combined dispersing and catalyzing agent for said polymerization, and as the sole catalyzing agent, an oxidized dispersing agent prepared by passing ozone-containing oxygen gas containing more than about 1% by weight ozone, as the sole oxidizing agent, through an aqueous solution of said water-soluble dispersing agent at a temperature of about 0–70° C. until at least about 0.154 part by weight of ozone per 100 parts by weight of dissolved water-soluble dispersing agent have passed into said aqueous solution, said water-soluble dispersing agent being selected from the group consisting of alkali metal base rosin soaps consisting of alkali metal salts of abietic acid, dehydroabietic acid and tetrahydroabietic acid; alkali metal base fatty acid soaps consisting of alkali metal salts of aliphatic carboxylic acids containing 5–25 carbon atoms and from 0–3 olefinic linkages; alkali metal salts of condensates of naphthalene sulfonic acids with formaldehyde; alkali metal salts of alkyl aryl sulfonates, and ethylene oxide condensates with alkyl phenols.

2. The process of claim 1 wherein the oxidized dispersing agent used in the polymerization reaction is oxidized sodium stearate.

3. The process of claim 1 wherein the oxidized dispersing agent used in the polymerization reaction is oxidized potassium rosin soap.

4. The process of claim 1 wherein the oxidized dispersing agent used in the polymerization reaction is oxidized sodium salt of beta-naphthalene sulfonic acid condensed with formaldehyde.

5. The process of claim 1 wherein the oxidized dispersing agent used in the polymerization reaction is oxidized sodium alkyl aryl sulfonate.

6. The process of claim 1 wherein the oxidized dispersing agent used in the polymerization reaction is oxidized ethylene oxide condensate with a nonylated phenol.

7. In the aqueous emulsion polymerization of butadiene-1,3 with a polymerizable hydrocarbon compound containing 4–14 carbon atoms and a $CH_2=C<$ group in the presence of a water-soluble dispersing agent and a peroxygen catalyst for said polymerization, the improvement which comprises carrying out the polymerization while using as a combined dispersing and catalyzing agent for said polymerization, and as the sole peroxygen catalyzing agent, an oxidized dispersing agent prepared by passing ozone-containing oxygen gas containing more than about 1% by weight ozone as the sole oxidizing agent through an aqueous solution of said water-soluble dispersing agent at a temperature of 0–70° C. until at least about 0.154 part by weight of ozone per 100 parts by weight of dissolved water-soluble dispersing agent have passed into said aqueous solution, said water-soluble dispersing agent being selected from the group consisting of alkali metal base rosin soaps consisting of alkali metal salts of abietic acid, dehydroabietic acid and tetrahydroabietic acid; alkali metal base fatty acid soaps consisting of alkali metal salts of aliphatic carboxylic acids containing 5–25 carbon atoms and from 0–3 olefinic linkages; alkali metal salts of condensates of naphthalene sulfonic acids with formaldehyde; alkali metal salts of alkyl aryl sulfonates, and ethylene oxide condensates with alkyl phenols.

8. The process of claim 7 wherein the polymerizable hydrocarbon compound is styrene.

References Cited in the file of this patent

UNITED STATES PATENTS

| | | |
|---|---|---|
| 2,357,613 | Sternbach | Sept. 5, 1944 |
| 2,434,643 | Drake | Jan. 20, 1948 |
| 2,490,712 | Schulze et al. | Dec. 6, 1949 |
| 2,580,315 | Park | Dec. 25, 1951 |
| 2,630,426 | Uraneck et al. | Mar. 3, 1953 |

OTHER REFERENCES

Partington: A Textbook of Inorganic Chemistry, Macmillian (1953), page 150.

Houtz et al.: "J. Am. Chem. Soc.," vol. 58 (1931), pp. 1058–1063.

Krestinskii et al.: "Chem. Abstracts," vol. 34 (1940), pages 6296–7.

Briner et al.: ibid, page 1640.

Schildknecht: Polymer Processes, Interscience (1956), pages 136–138.